United States Patent
Landais et al.

(10) Patent No.: US 7,586,875 B2
(45) Date of Patent: Sep. 8, 2009

(54) METHOD OF RESELECTING CELLS IN A PACKET MODE CELLULAR MOBILE RADIO SYSTEM

(75) Inventors: Bruno Landais, Pleumeur-Bodou (FR); Vincent Muniere, Paris (FR)

(73) Assignee: Evolium S.A.S., Paris (FR)

( * ) Notice: Subject to any disclaimer, the term of this patent is extended or adjusted under 35 U.S.C. 154(b) by 1226 days.

(21) Appl. No.: 10/097,631

(22) Filed: Mar. 15, 2002

(65) Prior Publication Data

US 2002/0137522 A1    Sep. 26, 2002

(30) Foreign Application Priority Data

Mar. 19, 2001  (FR)  .................................. 01 03713

(51) Int. Cl.
*H04W 4/00*  (2006.01)
(52) U.S. Cl. ........................ 370/331; 370/332; 455/436; 455/437
(58) Field of Classification Search ................... 370/331, 370/332, 338, 353; 455/435, 436, 437
See application file for complete search history.

(56) References Cited

U.S. PATENT DOCUMENTS

| | | | | |
|---|---|---|---|---|
| 5,930,710 A * | 7/1999 | Sawyer et al. | ................ | 455/436 |
| 6,647,262 B1 * | 11/2003 | Demetrescu et al. | ........ | 455/436 |
| 6,714,784 B1 * | 3/2004 | Forssell et al. | .............. | 455/436 |
| 6,751,472 B1 * | 6/2004 | Muhonen | .................. | 455/553.1 |
| 2002/0197992 A1 * | 12/2002 | Nizri et al. | .................. | 455/435 |

FOREIGN PATENT DOCUMENTS

| | | |
|---|---|---|
| EP | 1 081 969 A1 | 3/2001 |
| WO | WO 00/27158 A1 | 5/2000 |
| WO | WO 01/47298 A2 | 6/2001 |

* cited by examiner

*Primary Examiner*—William Trost, IV
*Assistant Examiner*—Toan D Nguyen
(74) *Attorney, Agent, or Firm*—Sughrue Mion, PLLC

(57) ABSTRACT

A method of reselecting cells in a packet mode cellular mobile radio system, which method includes a step in which a mobile station connected in packet mode to a server cell attempts to connect in packet mode to a target reselected cell, which method is essentially characterized in that if the mobile station cannot connect to the target reselected cell, it sends the network cell update information indicating its server cell as the new cell.

16 Claims, 2 Drawing Sheets

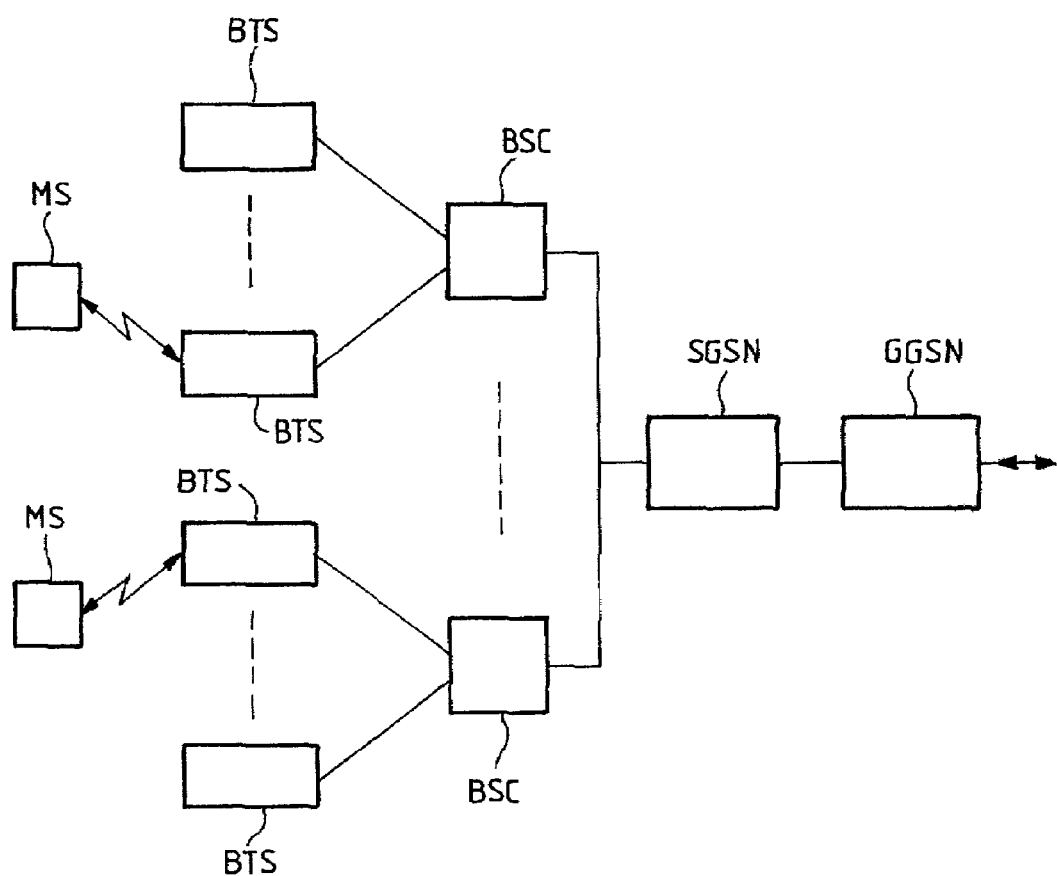
FIG_1

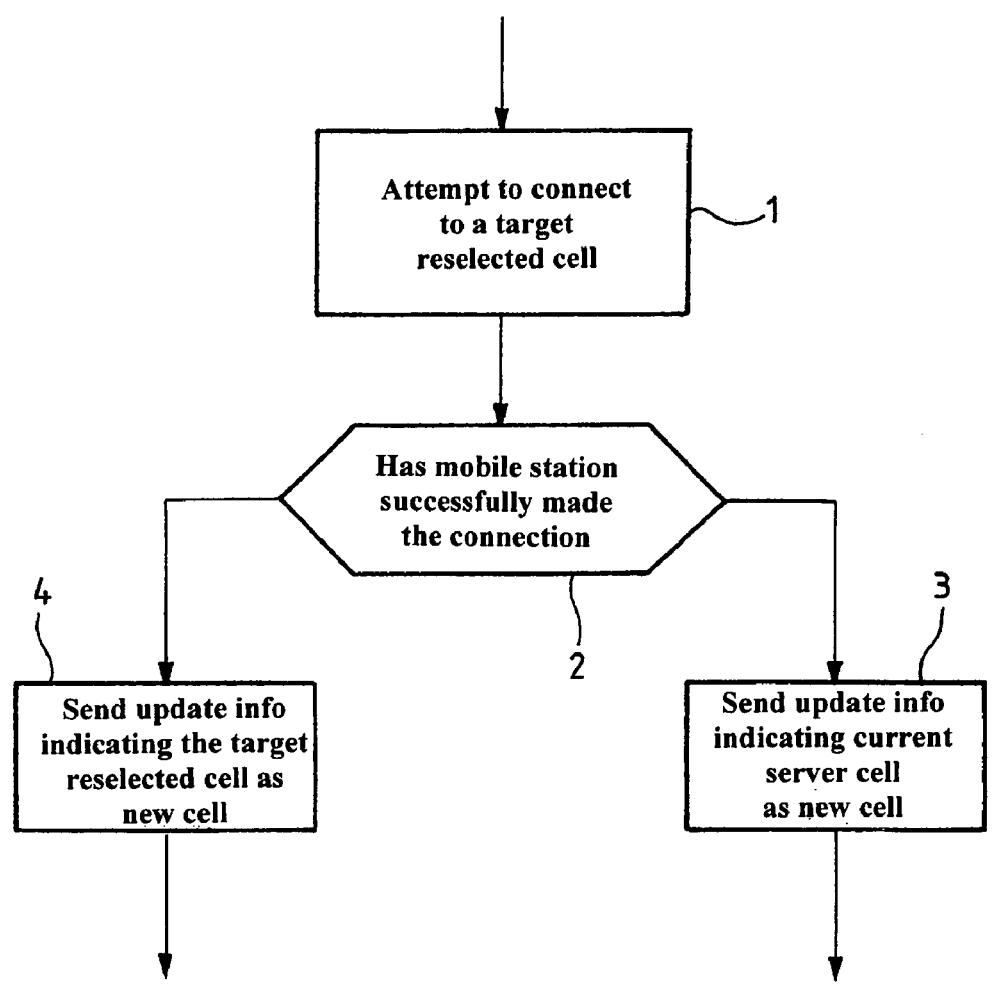

METHOD OF RESELECTING CELLS IN A PACKET MODE CELLULAR MOBILE RADIO SYSTEM

BACKGROUND OF THE INVENTION

The present invention relates generally to cellular mobile radio systems.

The present invention relates more particularly to packet mode services such as the General Packet Radio Service (GPRS) for Global System for Mobile communications (GSM) mobile radio systems.

The architecture of packet mode systems, for example GPRS systems, is shown in FIG. 1 and essentially comprises:

- base transceiver stations (BTS) communicating with mobile stations (MS), and base station controllers (BSC), the combination of the BTS and the BSC being referred to as the base station subsystem (BSS), or more generally as the radio access network (RAN), and
- entities such as serving GPRS support nodes (SGSN) communicating with the BSS and with gateway GPRS support nodes (GGSN), which in turn communicate with external networks (not shown), the combination of the SGSN and the GGSN being referred to as the network subsystem (NSS), or more generally the core network (CN).

In the layered architecture used to describe the above systems, the "Um" interface between the MS and the BBS includes:

- a first layer called the physical layer, and
- a second layer called the link layer, in turn divided into the following plurality of layers, in order of increasing level: a Medium Access Control (MAC) layer, a Radio Link Control (RLC) layer, and a Logical Link Control (LLC) layer.

Similarly, the "Gb" interface between the BSS and the SGSN includes:

- a first layer called the physical layer, and
- a second layer called the link layer, in turn divided into the following plurality of layers, in order of increasing level: a frame relay layer, a BSS GPRS Protocol (BSSGP) layer, and a Logical Link Control (LLC) layer.

LLC frames are formed in the LLC layer from higher level data units. In LLC frames the data units are called LLC-protocol data units (LLC-PDU).

The LLC-PDU are then segmented in the MAC/RLC layer to form RLC data blocks. The RLC data blocks are then formatted as required for transmission at the "Um" interface, in the physical layer.

Also, the RLC and LLC layers use procedures for retransmitting data that is not received correctly (RLC data blocks or LLC-PDU, as appropriate), using an Automatic Repeater Request (ARQ) technique. The correct or incorrect status of the blocks or data units received is signaled by the receiver to the sender by means of acknowledgement (ACK) messages or non-acknowledgement (NACK) messages.

Higher level signaling protocols are also provided, in particular for GPRS radio resource (GRR) management, GPRS mobility management (GMM), session management (SM), etc.

In particular, the GMM protocol defines three possible states of a mobile station, namely an idle state, a standby state and a ready state.

For a more detailed description of the above systems, see the corresponding standards published by the corresponding standardization bodies.

Also, the above systems have a cellular architecture and intercellular transfer techniques are provided for transferring circuit mode calls from cell to cell as and when required.

Packet mode services generally employ a cell reselection procedure and there are generally several cell reselection control modes, corresponding to decreasing degrees of autonomy of the mobile station or, which amounts to the same thing, increasing degrees of control by the network. In the GPRS, for example, as specified in the standards 3GPP TS 05.08 and 3G TS 04.60 published by the third generation partnership project (3GPP):

In a first control mode NC0, the mobile station decides autonomously to effect a transfer and itself selects the target cell to which the call is to be transferred, taking account of the results of measurements that it performs.

In a second control mode NC1, the mobile station decides autonomously to effect a transfer and itself selects the target cell to which the call is to be transferred, taking account of the results of measurements that it carries out, and additionally transmits the results of those measurements to the network.

In a third control mode NC2, the network decides to effect a transfer and selects the target cell to which the call is to be transferred, taking account of the results of measurements transmitted to it by the mobile station.

The control mode NC2 is also known as network-controlled cell reselection. In this case, the network orders cell reselection by sending the mobile station a "Packet Cell Change Order" message containing the identity of the reselected cell.

Thus the control modes NC0 and NC1 correspond to a mode of cell reselection controlled by the mobile station. In this case the mobile station itself decides on cell reselection.

Also, a Cell Change Notification (CCN) procedure is defined in the standard 3G TS 04.60 for mobile stations operating in the modes NC0 and NC1. In this case, the mobile station that has decided on cell reselection informs the network (BSS) in a "Packet Cell Change Notification" message of the reselected cell that it is proposing. In response, the network can indicate the chosen reselected cell to it in a "Packet Cell Change Order" message containing the identity of that cell. The corresponding control mode is also known as network-assisted cell reselection.

Once a target cell has been determined by the mobile station or ordered by the network, in either of these control modes, the mobile station must carry out certain operations necessary for it to connect to the target cell in packet mode.

In particular, it is necessary for the mobile station to access the cell concerned and in particular to acquire information, known as system information, broadcast on a common channel in the target cell; as also specified in the document previously cited, the common channel can be the packet broadcast control channel (PBCCH) or the broadcast control channel (BCCH). If the PBCCH is used, the system information is referred to as packet system information. The system information includes information indicating to the mobile station how to access the target cell in packet mode. Unlike the handover procedure used in circuit mode, the resources to be used in the target cell are not predetermined by the network. The system information includes a number of parameters for configuring cell reselection. Some system information is required before the mobile station can be authorized to access the target cell, and this information differs according to whether it is carried by the PBCCH or the BCCH.

The mode of broadcasting the necessary system information on the PBCCH or BCCH is such that the time for the mobile station to acquire the information can be extremely long, and this time is also not predetermined. This can affect downlink data transfer. The SGSN continues to transfer LLC-PDU to the BSS, which attempts to deliver them to the mobile station in the form of RLC data blocks. However, because the mobile station is in the process of acquiring the system information relating to the target cell, many RLC data blocks are lost, i.e. not received by the mobile station. This is because, as specified in the standard 3G TS 04.60, the mobile station is at this time authorized to suspend the operations in progress in the old cell for as long as is necessary to receive the required messages on the BCCH or PBCCH from the target cell. Many retransmissions may then be needed at the RLC/MAC layer and/or LLC layer level, the main disadvantage of which is that it delays the transfer of data (and therefore degrades the quality of service), and does not correspond to optimum use of the radio resources. The mobile station can also switch over to the target cell at any time, in which case attempting to continue the transfer in the downlink direction in the old cell would be in vain. It could even be harmful, as the PDU sent in LLC mode and not acknowledged would simply be lost.

To limit these drawbacks, according to the standard 3GPP TS 08.18, if the BSS has ordered a mobile station to perform cell reselection, the BSS can request the SGSN to interrupt the transfer of data to the BSS temporarily to enable the mobile station to carry out the operations necessary for it to connect to the target reselected cell in packet mode. The BSS submits this request to the SGSN in a "BSSGP RADIO STATUS PDU" message for which the cause is "cell reselection ordered".

When the mobile station has successfully completed the operations necessary for it to connect to the target reselected cell in packet mode, using the GPRS mobility management (GMM) protocol, it sends the network a cell update message indicating the identity of the target reselected cell. On receiving this message, the SGSN can then resume the interrupted transfer of data.

The applicant has realized that problems can nevertheless arise.

This is because, in some situations, the mobile station cannot send the cell update message to the SGSN, in which case the SGSN cannot resume the transfer.

A first situation corresponds to the network-assisted cell reselection mode, i.e. that in which the Cell Change Notification (CCN) procedure applies to a mobile station operating in the control mode NC0 or NC1. In this case, and as in the control mode NC2, the BSS is in the process of cell reselection, and can also send the SGSN a "BSSGP RADIO STATUS" message, for which the cause is "cell reselection ordered", and the SGSN can then also suspend the downlink transfer. It is nevertheless possible, before the change to the cell reselected in this way, for the mobile station to decide to remain in the current cell, because of a change in radio conditions. In this case, the mobile station does not send the cell update message to the SGSN, which then cannot resume the transfer.

A second situation corresponds to the case of a mobile station operating in the control mode NC2. The BSS can then send the SGSN a "BSSGP RADIO STATUS" message, for which the cause is "cell reselection ordered", and the SGSN can therefore suspend the downlink transfer. However, because the GMM protocol provides different possible states of a mobile station, the mobile station may have already changed from the ready state to the standby state. According to the standard 3G TS 05.08, the mobile station when in the standby state cannot use the control mode NC2, and must use the control mode NC0 or NC1. In this case, the mobile station does not send the cell update message to the SGSN, which then cannot resume the transfer.

These situations are therefore ones in which the cell reselection process is stopped or abandoned.

Apart from these situations, cell reselection can also fail for other reasons, in particular because the mobile station cannot access the reselected cell or because no resources are available in that cell. The 3G TS 04.60 standard also provides for the mobile station to send the network a "Packet Cell Change Failure" message informing the network that a cell reselection ordered by the network has failed, but the standard does not specify what should be done in this situation. Furthermore, this kind of message is sent by the mobile station to the BBS [sic] with no acknowledgement by the BSS, and there is therefore no guarantee that it is received by the BSS.

The applicant has addressed these problems and the best solution to them.

Several solutions have been envisaged.

A first solution would be not to transmit the "BSSGP RADIO STATUS" message for which the cause is "cell reselection ordered". However, in this case the transfer would not be suspended while the mobile station attempted to connect to the target reselected cell, in which case it is very possible that downlink LLC-PDU would be lost because the BSS could not send them to the mobile station.

A second solution would be to resume the downlink transfer either on receiving a cell update message (if the operations necessary to connect to the target reselected cell had been carried out successfully), or on the expiry of a particular time-delay (if the above operations could not be effected successfully). However, resuming the transfer on the basis of an expired time-delay can lead either to the loss of downlink LLC-PDU if the time-delay is too short (i.e. if the mobile station is still attempting to connect to the reselected cell), or to unnecessarily delaying the resumption of the transfer if the time-delay is too long and cell reselection has already failed.

A third solution would be for the SGSN, when it still has downlink LLC-PDU to transmit, to search for the mobile station in the routing area or in the BSS area from which it receives a "BSSGP RADIO STATUS" message for which the cause is "cell reselection ordered". However, this leads to an increase in the number of paging messages sent at the radio interface, and defers the resumption of downlink data transfer until the mobile station responds successfully to the paging request Also, if there is a downlink transfer of data in progress in the current server cell and cell reselection is abandoned or fails, the BSS then cannot (in the current version of the standard) send paging messages to the packet data channel (PDCH) resources allocated to the mobile station.

Thus the various solutions discussed above do not solve the problems previously stated in an optimum manner.

The present invention proposes another approach which in particular avoids the various drawbacks previously mentioned.

SUMMARY OF THE INVENTION

Thus one object of the present invention is to provide a method of reselecting cells in a packet mode cellular mobile radio system, which method includes a step in which a mobile station connected in packet mode to an initial server cell attempts to connect in packet mode to a target reselected cell, which method is essentially characterized in that if the mobile station cannot connect to the target reselected cell, it sends the network cell update information indicating the initial server cell as the new cell.

According to another feature of the invention downlink data transfer is interrupted to enable the mobile station to connect in packet mode to the target reselected cell and resumed on receipt of said cell update message.

According to another feature of the invention said cell update information is transmitted in the case of a mobile station operating in a network-assisted cell reselection mode and having successively decided to reselect a cell before said interruption and then not to reselect any cell after said interruption.

According to another feature of the invention said cell update information is transmitted in the case of a mobile station operating in a network-controlled cell reselection mode before said interruption and then in a mode of cell reselection controlled by the mobile station after said interruption.

According to another feature of the invention said cell update information is transmitted in the case of a mobile station unable to access the target reselected cell.

According to another feature of the invention said cell update information is transmitted in the case of lack of resource in the target reselected cell.

According to another feature of the invention the data transfer that is interrupted is a transfer from an entity that is part of the core network of said system to an entity that is part of the radio access network of said system.

According to another feature of the invention, in a GSM/GPRS system, said entity that is part of the core network of said system is a serving GPRS support node (SGSN) entity.

According to another feature of the invention, in a GSM/GPRS system, said entity that is part of the radio access network of said system is a base station subsystem (BSS) entity.

According to another feature of the invention said cell update information is transmitted by means of a cell update message of the same type as that used if the mobile station can connect to the target reselected cell, in which case said message indicates the target reselected cell as the new cell.

According to another feature of the invention, in a GSM/GPRS system, said message is a "Cell Update" message.

According to another feature of the invention said message is sent in acknowledged mode.

Another object of the invention is to provide a mobile radio system including means for implementing the above method.

Another object of the invention is to provide a mobile radio network entity including means for implementing the above method.

Another object of the invention is to provide a mobile station including means for implementing the above method.

BRIEF DESCRIPTION OF THE DRAWINGS

Other objects and features of the present invention will become apparent on reading the following description of one embodiment of the invention, which is given with reference to the accompanying drawings, in which:

FIG. 1 (previously described) is a diagram of the general architecture of a GPRS cellular radio system, and FIG. 2 is a diagram illustrating one example of a method according to the invention.

DETAILED DESCRIPTION OF EXEMPLARY EMBODIMENTS OF THE INVENTION

Thus one object of the present invention is a method of reselecting cells in a packet mode cellular radio system. As previously outlined, a step is generally provided during which a mobile station connected in packet mode to a server cell attempts to connect in packet mode to a target reselected cell.

As previously outlined, in the current version of the standard, there is provision for a mobile station to send the network a message (in unacknowledged mode) indicating that it has not succeeded in connecting to the target reselected cell or a cell update message (indicating the identity of the target reselected cell) if it has succeeded in connecting to the target cell.

The present invention proposes another approach, whereby, if the mobile station cannot connect to the target reselected cell, it sends the network cell update information indicating its server cell as the new cell.

In other words, in accordance with the present invention, the mobile station always sends cell update information, but the identity of the new cell is not the same, depending on whether the mobile station has succeeded in connecting to the target cell or not.

Furthermore, this kind of cell update information is sent in acknowledged mode (in this instance on a temporary block flow (TBF) in acknowledged RLC mode), and is therefore received by the BSS.

If the downlink transfer is interrupted to enable the mobile station to connect to the target reselected cell in packet mode, the transfer is advantageously resumed when the network receives said cell update information.

In particular this avoids the drawbacks of this mode of operation previously mentioned. The present invention is not limited to this mode of operation, however.

For example, said cell update information is sent in the case of a mobile station operating, as previously explained, in a network-assisted cell reselection mode, and having successively decided, before and then after said transfer interruption, to reselect a cell and then not to reselect any cell.

Alternatively, said cell update information is sent in the case of a mobile station operating, as previously explained, in a network-controlled cell reselection mode before said transfer interruption and then in a cell reselection mode controlled by the mobile station after said transfer interruption.

Alternatively, said cell update information is sent in the case of a mobile station that cannot access the target reselected cell.

Alternatively, said cell update information is sent in the event of lack of resource in the target reselected cell.

Other examples are feasible, of course, and the invention of course applies in all cases in which the mobile station does not succeed in connecting to the target cell, regardless of the reason for this.

The data transfer that is interrupted is generally a transfer from an entity that is part of the core network of said system to an entity that is part of the radio access network of said system.

In particular, in a GSM/GPRS network, said entity that is part of the core network of said system is a serving GPRS support node (SGSN) entity.

In particular, in a GSM/GPRS network, said entity that is part of the radio access network of said system is a base station subsystem (BSS) entity.

Said cell update information is advantageously sent by means of a cell update message of the same type as that used when the mobile station can connect to the target reselected cell, in which case the message indicates the target reselected cell as the new cell.

In particular, in a GSM/GPRS system, said message is a "Cell Update" message.

In particular, this kind of message is sent in acknowledged mode.

The example shown in FIG. 2 includes a step 1 in which the mobile station attempts to connect to a target reselected cell. Step 2 determines whether the mobile station has successfully effected the operations necessary to make the connection. If the conclusion is no, in step 3 the mobile station sends the network cell update information indicating its current server cell as the new cell. If the conclusion is yes, in step 4 the mobile station sends the network cell update information indicating the target reselected cell as the new cell.

The figure as described in this way is only a highly schematic representation of one embodiment of a method according to the invention, and does not go into the details of the signaling protocols or procedures, which can additionally rely on principles already known in such systems.

In addition to the above method, another object of the present invention is to provide a cellular mobile radio system, a cellular radio network, a cellular mobile radio network equipment or entity, and a mobile station all including means for implementing the method.

The specific implementation of such means representing no particular difficulty for the person skilled in the art, such means do not need to be described here in any more detail than by stating their function, as previously.

The invention claimed is:

1. A method of reselecting cells in a packet mode cellular mobile radio system, the method comprising:
    attempting to connect in packet mode a mobile station, which is connected in packet mode to an initial server cell, to a target reselected cell; and
    if the mobile station cannot connect to the target reselected cell, sending from the mobile station to a network cell update information indicating the initial server cell is the new cell.

2. The method according to claim 1, wherein downlink data transfer is interrupted to enable the mobile station to connect in packet mode to the target reselected cell and resumed on receipt of said cell update message.

3. The method according to claim 2, wherein the data transfer that is interrupted is a transfer from an entity that is part of a core network of said system to an entity that is part of a radio access network of said system.

4. The method according to claim 3, wherein, in a GSM/GPRS network, said entity that is part of the core network of said system is a serving GPRS support node (SGSN) entity.

5. The method according to claim 3, wherein, in a GSM/GPRS network, said entity that is part of the radio access network of said system is a base station subsystem (BSS) entity.

6. The method according to claim 1, wherein said cell update information is transmitted in the case of a mobile station operating in a network-assisted cell reselection mode and having successively decided, before and then after said interruption, to reselect a cell and then not to reselect any cell.

7. The method according to claim 1, wherein said cell update information is transmitted in the case of a mobile station operating in a network-controlled cell reselection mode before said interruption and then in a mode of cell reselection controlled by the mobile station after said interruption.

8. The method according to claim 1, wherein said cell update information is transmitted in the case of a mobile station unable to access the target reselected cell.

9. The method according to claim 1, wherein said cell update information is transmitted in the case of lack of resource in the target reselected cell.

10. The method according to claim 1, wherein said cell update information is transmitted by means of a cell update message of the same type as that used if the mobile station can connect to the target reselected cell, in which case said message indicates the target reselected cell as the new cell.

11. The method according to claim 10, wherein, in a GSM/GPRS system, said message is a "CELL UPDATE" message.

12. The method according to claim 10, wherein said message is sent in acknowledged mode.

13. A mobile radio network entity having a mobile station connected therewith, wherein the mobile station, which is connected in packet mode to an initial server cell, attempts to connect in packet mode to a target reselected cell, and if the mobile station cannot connect to the target reselected cell, the mobile station sends cell update information to a network indicating the initial server cell is the new cell.

14. A mobile station which is connected in packet mode to an initial server cell and is configured to attempt to connect to a target reselected cell in packet mode, and if the mobile station cannot connect to the target reselected cell, to send cell update information to a network indicating the initial server cell is the new cell.

15. A mobile radio network entity for a packet mode cellular mobile radio system, the mobile radio network entity comprising:
    means for interrupting downlink data transfer to enable a mobile station to connect in packet mode to a target reselected cell; and
    means for resuming said downlink data transfer to said mobile station in an initial server cell of the mobile radio network entity on receipt, from said mobile station, of cell update information indicating the initial server cell of the mobile radio network entity as the new cell.

16. A mobile station for a packet mode cellular mobile radio system, said mobile station comprising:
    means for attempting to connect in packet mode to a target reselected cell; and
    means for sending to a network cell update information indicating an initial server cell of the mobile station as the new cell, if said mobile station cannot connect to the target reselected cell.

* * * * *

UNITED STATES PATENT AND TRADEMARK OFFICE
CERTIFICATE OF CORRECTION

PATENT NO. : 7,586,875 B2
APPLICATION NO. : 10/097631
DATED : September 8, 2009
INVENTOR(S) : Landais et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1895 days.

Signed and Sealed this

Twenty-first Day of September, 2010

David J. Kappos
*Director of the United States Patent and Trademark Office*